United States Patent
Lietz et al.

(10) Patent No.: US 9,866,581 B2
(45) Date of Patent: Jan. 9, 2018

(54) METHOD AND SYSTEM FOR SECURE DELIVERY OF INFORMATION TO COMPUTING ENVIRONMENTS

(71) Applicant: Intuit Inc., Mountain View, CA (US)

(72) Inventors: M. Shannon Lietz, San Marcos, CA (US); Luis Felipe Cabrera, Bellevue, WA (US); Thomas Bishop, San Diego, CA (US); Brett Weaver, San Diego, CA (US); Capen Brinkley, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 667 days.

(21) Appl. No.: 14/319,286

(22) Filed: Jun. 30, 2014

(65) Prior Publication Data

US 2015/0381651 A1    Dec. 31, 2015

(51) Int. Cl.
*H04L 29/06* (2006.01)
*G06F 21/57* (2013.01)
*G06F 21/60* (2013.01)

(52) U.S. Cl.
CPC .......... *H04L 63/1441* (2013.01); *G06F 21/57* (2013.01); *G06F 21/606* (2013.01); *H04L 63/1408* (2013.01); *H04L 63/107* (2013.01)

(58) Field of Classification Search
CPC ................................................. H04L 63/1441
See application file for complete search history.

(56) References Cited

U.S. PATENT DOCUMENTS 5,712,641 A   1/1998  Casabona et al.
5,731,991 A   3/1998  Kinra et al.
(Continued)

FOREIGN PATENT DOCUMENTS

EP       2 541 420        1/2013
WO    WO 02/091182     11/2002
(Continued)

OTHER PUBLICATIONS

Lietz et al., "Method and System for Dynamic and Comprehensive Vulnerability Management," U.S. Appl. No. 14/052,971, filed Oct. 14, 2013.
(Continued)

*Primary Examiner* — Anthony Brown
*Assistant Examiner* — William Corum, Jr.
(74) *Attorney, Agent, or Firm* — Hawley Troxell Ennis & Hawley LLP; Philip McKay

(57) ABSTRACT

A method and system for protecting and repairing a current virtual asset from damage by potential security threats, according to one embodiment. The method and system include monitoring a current a current virtual asset for potential security threats, with a virtual asset agent, according to one embodiment. The method and system include determining a severity of the potential security threats that are identified by the virtual asset agent, according to one embodiment. The method and system include creating a new virtual asset with the virtual asset agent and decommissioning the current virtual asset, according to one embodiment. The system and method receiving, with the new virtual asset, secrets that are associated with the current virtual asset to enable the new virtual asset to continue operations of the current virtual asset, according to one embodiment.

12 Claims, 4 Drawing Sheets

(56) References Cited

U.S. PATENT DOCUMENTS

| | | |
|---|---|---|
| 6,085,224 A | 7/2000 | Wagner |
| 6,178,452 B1 | 1/2001 | Miyamoto |
| 6,205,552 B1 | 3/2001 | Fudge |
| 6,343,236 B1 | 1/2002 | Gibson et al. |
| 6,549,932 B1 | 4/2003 | McNally et al. |
| 6,651,183 B1 | 11/2003 | Gensler et al. |
| 7,055,062 B2 | 5/2006 | Shah et al. |
| 7,114,183 B1 | 9/2006 | Joiner |
| 7,296,261 B2 | 11/2007 | Witchel et al. |
| 7,373,524 B2 | 5/2008 | Motsinger et al. |
| 7,426,745 B2 | 9/2008 | McCarty |
| 7,506,371 B1 | 3/2009 | Ben-Natan |
| 7,552,424 B1 | 6/2009 | Bischof et al. |
| 7,600,153 B2 | 10/2009 | Cabrera et al. |
| 7,640,458 B2 | 12/2009 | Rao et al. |
| 7,761,923 B2 | 7/2010 | Khuti et al. |
| 7,788,235 B1 | 8/2010 | Yeo |
| 7,792,256 B1 | 9/2010 | Arledge et al. |
| 7,831,570 B2 | 11/2010 | Sack et al. |
| 7,925,527 B1 | 4/2011 | Flam |
| 7,934,229 B1* | 4/2011 | Vogel .................. G06F 21/568 725/24 |
| 7,944,355 B2 | 5/2011 | Kumar et al. |
| 7,996,836 B1 | 8/2011 | McCorkendale et al. |
| 8,001,422 B1 | 8/2011 | Sun et al. |
| 8,095,962 B2 | 1/2012 | Condon |
| 8,108,855 B2 | 1/2012 | Dias et al. |
| 8,161,475 B2 | 4/2012 | Araujo et al. |
| 8,171,485 B2 | 5/2012 | Muller |
| 8,171,554 B2 | 5/2012 | Elovici et al. |
| 8,181,036 B1 | 5/2012 | Nachenberg |
| 8,266,670 B1 | 9/2012 | Merkow et al. |
| 8,281,399 B1 | 10/2012 | Chen et al. |
| 8,312,516 B1 | 11/2012 | Malatesta |
| 8,327,373 B2 | 12/2012 | Srinivasan |
| 8,438,643 B2 | 5/2013 | Wiemer et al. |
| 8,510,821 B1 | 8/2013 | Brandwine et al. |
| 8,555,388 B1 | 10/2013 | Wang et al. |
| 8,561,126 B2 | 10/2013 | Ananthanarayanan et al. |
| 8,561,127 B1 | 10/2013 | Agrawal et al. |
| 8,572,733 B1 | 10/2013 | Rockwood |
| 8,615,785 B2 | 12/2013 | Elrod et al. |
| 8,621,618 B1 | 12/2013 | Ramsey et al. |
| 8,683,585 B1 | 3/2014 | Chen et al. |
| 8,688,820 B1 | 4/2014 | Bhogi et al. |
| 8,726,383 B2 | 5/2014 | Blackwell |
| 8,776,050 B2 | 7/2014 | Plouffe et al. |
| 8,813,225 B1 | 8/2014 | Fuller et al. |
| 8,863,284 B1 | 10/2014 | Polyakov et al. |
| 8,959,633 B1 | 2/2015 | Dokey et al. |
| 8,990,935 B1 | 3/2015 | Cutts |
| 9,047,582 B2 | 6/2015 | Hutchinson et al. |
| 9,049,105 B1 | 6/2015 | Feinstein et al. |
| 9,112,841 B1 | 8/2015 | Brandwine et al. |
| 9,215,153 B2 | 12/2015 | DeLuca et al. |
| 9,270,690 B2 | 2/2016 | Kraitsman et al. |
| 2002/0066034 A1 | 5/2002 | Schlossberg et al. |
| 2002/0099992 A1 | 7/2002 | Distler et al. |
| 2002/0116404 A1 | 8/2002 | Cha et al. |
| 2002/0138416 A1 | 9/2002 | Lovejoy et al. |
| 2002/0147803 A1 | 10/2002 | Dodd et al. |
| 2002/0156904 A1 | 10/2002 | Gullotta et al. |
| 2003/0037263 A1 | 2/2003 | Kamat et al. |
| 2003/0046128 A1 | 3/2003 | Heinrich |
| 2003/0051154 A1 | 3/2003 | Barton et al. |
| 2003/0084327 A1 | 5/2003 | Lingafelt et al. |
| 2003/0088791 A1 | 5/2003 | Porras et al. |
| 2003/0110392 A1 | 6/2003 | Aucsmith et al. |
| 2003/0188191 A1 | 10/2003 | Aaron et al. |
| 2003/0195959 A1 | 10/2003 | Labadie et al. |
| 2003/0233438 A1 | 12/2003 | Hutchinson et al. |
| 2004/0006704 A1 | 1/2004 | Dahlstrom et al. |
| 2004/0181775 A1 | 9/2004 | Anonsen et al. |
| 2004/0237093 A1 | 11/2004 | Sluiman et al. |
| 2004/0249973 A1 | 12/2004 | Alkhatib et al. |
| 2004/0249974 A1 | 12/2004 | Alkhatib et al. |
| 2005/0018618 A1 | 1/2005 | Mualem et al. |
| 2005/0066309 A1 | 3/2005 | Creamer et al. |
| 2005/0091304 A1 | 4/2005 | Trayler |
| 2005/0114836 A1 | 5/2005 | Fu |
| 2005/0155013 A1 | 7/2005 | Carrigan |
| 2005/0172162 A1 | 8/2005 | Takahashi et al. |
| 2005/0182969 A1 | 8/2005 | Ginter et al. |
| 2005/0188222 A1 | 8/2005 | Motsinger et al. |
| 2005/0193231 A1 | 9/2005 | Scheuren |
| 2005/0193269 A1 | 9/2005 | Haswell et al. |
| 2005/0204151 A1 | 9/2005 | Fang et al. |
| 2005/0278790 A1 | 12/2005 | Birk et al. |
| 2006/0031407 A1 | 2/2006 | Dispensa et al. |
| 2006/0037077 A1 | 2/2006 | Gadde et al. |
| 2006/0064740 A1 | 3/2006 | Kelley et al. |
| 2006/0090206 A1 | 4/2006 | Ladner et al. |
| 2006/0101520 A1 | 5/2006 | Schumaker et al. |
| 2006/0117209 A1 | 6/2006 | Drouet et al. |
| 2006/0136720 A1 | 6/2006 | Armstrong et al. |
| 2006/0184838 A1 | 8/2006 | Singonahalli et al. |
| 2006/0195745 A1 | 8/2006 | Keromytis et al. |
| 2006/0203739 A1 | 9/2006 | Padmanabhan et al. |
| 2006/0272018 A1 | 11/2006 | Fouant |
| 2006/0293940 A1 | 12/2006 | Tsyganskiy et al. |
| 2007/0006304 A1 | 1/2007 | Kramer et al. |
| 2007/0027999 A1 | 2/2007 | Allen et al. |
| 2007/0079168 A1 | 4/2007 | Sivakumar et al. |
| 2007/0094711 A1 | 4/2007 | Corley et al. |
| 2007/0180509 A1 | 8/2007 | Swartz et al. |
| 2007/0185875 A1 | 8/2007 | Chang et al. |
| 2007/0250424 A1 | 10/2007 | Kothari |
| 2008/0016570 A1 | 1/2008 | Capalik |
| 2008/0025288 A1 | 1/2008 | Benner et al. |
| 2008/0044018 A1 | 2/2008 | Scrimsher et al. |
| 2008/0141332 A1 | 6/2008 | Treinen |
| 2008/0148398 A1 | 6/2008 | Mezack et al. |
| 2008/0177691 A1 | 7/2008 | Alperovitch et al. |
| 2008/0244744 A1 | 10/2008 | Thomas et al. |
| 2008/0262990 A1 | 10/2008 | Kapoor et al. |
| 2008/0263670 A1 | 10/2008 | Stavrica |
| 2008/0295076 A1 | 11/2008 | McKain et al. |
| 2008/0307525 A1* | 12/2008 | Nickle ................ G06Q 10/06 726/22 |
| 2009/0007100 A1* | 1/2009 | Field ..................... G06F 21/53 718/1 |
| 2009/0007264 A1 | 1/2009 | Chatterjee et al. |
| 2009/0089682 A1 | 4/2009 | Baier et al. |
| 2009/0106838 A1 | 4/2009 | Clark et al. |
| 2009/0177717 A1* | 7/2009 | Meehan ............. H04L 63/0823 |
| 2009/0199273 A1 | 8/2009 | Yalamanchi |
| 2009/0205039 A1* | 8/2009 | Ormazabal ......... H04L 43/0894 726/11 |
| 2009/0228973 A1 | 9/2009 | Kumar et al. |
| 2009/0254970 A1 | 10/2009 | Agarwal et al. |
| 2009/0254990 A1 | 10/2009 | McGee |
| 2009/0288078 A1 | 11/2009 | Makonahalli et al. |
| 2009/0293056 A1 | 11/2009 | Ferris et al. |
| 2009/0300045 A1 | 12/2009 | Chaudhry et al. |
| 2009/0300423 A1 | 12/2009 | Ferris |
| 2009/0319527 A1 | 12/2009 | King et al. |
| 2010/0020700 A1 | 1/2010 | Kailash et al. |
| 2010/0030544 A1 | 2/2010 | Gopalan et al. |
| 2010/0042734 A1* | 2/2010 | Olafsson ............ H04L 63/0236 709/229 |
| 2010/0070964 A1 | 3/2010 | Blumfield et al. |
| 2010/0077203 A1 | 3/2010 | Ogawa et al. |
| 2010/0122317 A1 | 5/2010 | Yadav |
| 2010/0192220 A1 | 7/2010 | Heizmann et al. |
| 2010/0199351 A1* | 8/2010 | Protas ................... G06F 21/577 726/25 |
| 2010/0212010 A1 | 8/2010 | Stringer et al. |
| 2010/0217850 A1 | 8/2010 | Ferris |
| 2010/0251363 A1 | 9/2010 | Todorovic |
| 2010/0257267 A1* | 10/2010 | Sohn .................. H04L 63/1416 709/224 |
| 2010/0257580 A1 | 10/2010 | Zhao |
| 2010/0257599 A1 | 10/2010 | Gleichauf |
| 2010/0269121 A1 | 10/2010 | Montesissa et al. |

(56) References Cited

U.S. PATENT DOCUMENTS

| | | |
|---|---|---|
| 2010/0306268 A1 | 12/2010 | Bhatti et al. |
| 2010/0306354 A1 | 12/2010 | DeHaan et al. |
| 2010/0318481 A1 | 12/2010 | Feynman |
| 2011/0029957 A1 | 2/2011 | Shufer et al. |
| 2011/0034182 A1 | 2/2011 | Issa et al. |
| 2011/0040825 A1 | 2/2011 | Ramzan et al. |
| 2011/0047621 A1 | 2/2011 | Brando et al. |
| 2011/0055921 A1 | 3/2011 | Narayanaswamy et al. |
| 2011/0101109 A1 | 5/2011 | Bona et al. |
| 2011/0138382 A1 | 6/2011 | Hauser et al. |
| 2011/0138469 A1 | 6/2011 | Ye et al. |
| 2011/0145657 A1 | 6/2011 | Bishop et al. |
| 2011/0154324 A1 | 6/2011 | Pagan et al. |
| 2011/0167494 A1 | 7/2011 | Bowen et al. |
| 2011/0208677 A1 | 8/2011 | Zhou et al. |
| 2011/0208797 A1 | 8/2011 | Kim |
| 2011/0238855 A1 | 9/2011 | Korsunsky et al. |
| 2012/0005750 A1 | 1/2012 | Satish |
| 2012/0011510 A1 | 1/2012 | Yamakabe et al. |
| 2012/0039336 A1 | 2/2012 | Richmond et al. |
| 2012/0042362 A1 | 2/2012 | Vlasov et al. |
| 2012/0072985 A1 | 3/2012 | Davne et al. |
| 2012/0110672 A1 | 5/2012 | Judge et al. |
| 2012/0117654 A1 | 5/2012 | Yalakanti |
| 2012/0137367 A1 | 5/2012 | Dupont et al. |
| 2012/0144489 A1* | 6/2012 | Jarrett ................... G06F 21/566 726/24 |
| 2012/0151488 A1 | 6/2012 | Arcese et al. |
| 2012/0185390 A1 | 7/2012 | Palnitkar et al. |
| 2012/0185913 A1 | 7/2012 | Martinez et al. |
| 2012/0209947 A1 | 8/2012 | Glaser et al. |
| 2012/0210437 A1 | 8/2012 | Karande et al. |
| 2012/0233668 A1 | 9/2012 | Leafe et al. |
| 2012/0303776 A1 | 11/2012 | Ferris |
| 2012/0304300 A1 | 11/2012 | LaBumbard |
| 2012/0311016 A1 | 12/2012 | DeAnna et al. |
| 2012/0311157 A1 | 12/2012 | Erickson et al. |
| 2012/0311387 A1 | 12/2012 | Santhosh et al. |
| 2012/0324572 A1 | 12/2012 | Gordon et al. |
| 2012/0324576 A1 | 12/2012 | Clark et al. |
| 2013/0019242 A1 | 1/2013 | Chen et al. |
| 2013/0019314 A1 | 1/2013 | Ji et al. |
| 2013/0046667 A1 | 2/2013 | Hill et al. |
| 2013/0054792 A1 | 2/2013 | Sharaf |
| 2013/0055246 A1* | 2/2013 | Li ........................... G06F 9/455 718/1 |
| 2013/0055398 A1* | 2/2013 | Li ........................ G06F 21/577 726/25 |
| 2013/0067067 A1 | 3/2013 | Miri et al. |
| 2013/0091376 A1 | 4/2013 | Raspudic et al. |
| 2013/0097316 A1 | 4/2013 | Bender et al. |
| 2013/0104237 A1 | 4/2013 | Riley et al. |
| 2013/0117809 A1 | 5/2013 | McDougal et al. |
| 2013/0117852 A1 | 5/2013 | Stute |
| 2013/0125121 A1 | 5/2013 | White |
| 2013/0132854 A1 | 5/2013 | Raleigh et al. |
| 2013/0132950 A1 | 5/2013 | McLeod et al. |
| 2013/0133072 A1 | 5/2013 | Kraitsman et al. |
| 2013/0160072 A1 | 6/2013 | Reus et al. |
| 2013/0174259 A1 | 7/2013 | Pearcy et al. |
| 2013/0185795 A1 | 7/2013 | Winn et al. |
| 2013/0227695 A1 | 8/2013 | Shankar |
| 2013/0238786 A1 | 9/2013 | Khesin |
| 2013/0247135 A1 | 9/2013 | Kundu et al. |
| 2013/0247206 A1 | 9/2013 | Hugard et al. |
| 2013/0263209 A1 | 10/2013 | Panuganty |
| 2013/0263226 A1 | 10/2013 | Sudia |
| 2013/0276108 A1 | 10/2013 | Blackwell |
| 2013/0276152 A1 | 10/2013 | Hirsch et al. |
| 2013/0291068 A1 | 10/2013 | Huang et al. |
| 2013/0291087 A1 | 10/2013 | Kailash et al. |
| 2013/0305357 A1 | 11/2013 | Ayyagari et al. |
| 2013/0305369 A1 | 11/2013 | Karta et al. |
| 2013/0305371 A1 | 11/2013 | Figlin et al. |
| 2013/0333040 A1 | 12/2013 | Diehl et al. |
| 2013/0339514 A1 | 12/2013 | Crank et al. |
| 2013/0343207 A1 | 12/2013 | Cook et al. |
| 2013/0346596 A1 | 12/2013 | Balakrishnan et al. |
| 2013/0347131 A1 | 12/2013 | Mooring et al. |
| 2014/0013452 A1 | 1/2014 | Aissi et al. |
| 2014/0026122 A1 | 1/2014 | Markande et al. |
| 2014/0026179 A1 | 1/2014 | Devarajan et al. |
| 2014/0068784 A1 | 3/2014 | Merkow et al. |
| 2014/0074799 A1 | 3/2014 | Karampuri et al. |
| 2014/0082621 A1 | 3/2014 | Fitzgerald et al. |
| 2014/0089204 A1 | 3/2014 | Spies et al. |
| 2014/0096134 A1 | 4/2014 | Barak et al. |
| 2014/0165130 A1 | 6/2014 | Zaitsev |
| 2014/0173738 A1 | 6/2014 | Condry et al. |
| 2014/0189090 A1 | 7/2014 | Mikkilineni |
| 2014/0189680 A1 | 7/2014 | Kripalani |
| 2014/0196115 A1 | 7/2014 | Pelykh |
| 2014/0201836 A1 | 7/2014 | Amsler |
| 2014/0214460 A1 | 7/2014 | Rahnama |
| 2014/0258446 A1 | 9/2014 | Bursell |
| 2014/0258715 A1 | 9/2014 | Rodniansky |
| 2014/0259169 A1 | 9/2014 | Harrison |
| 2014/0282840 A1 | 9/2014 | Guinan |
| 2014/0289854 A1 | 9/2014 | Mahvi |
| 2014/0317737 A1 | 10/2014 | Shin et al. |
| 2014/0344933 A1 | 11/2014 | Huh et al. |
| 2015/0032587 A1 | 1/2015 | Broom et al. |
| 2015/0033340 A1 | 1/2015 | Giokas |
| 2015/0052108 A1 | 2/2015 | Volk et al. |
| 2015/0052402 A1 | 2/2015 | Gurumurthy et al. |
| 2015/0052520 A1 | 2/2015 | Crowell et al. |
| 2015/0067865 A1* | 3/2015 | Seacat Deluca ...... G06F 21/554 726/25 |
| 2015/0082307 A1* | 3/2015 | Bell ..................... G06F 9/45533 718/1 |
| 2015/0095691 A1 | 4/2015 | Edwards |
| 2015/0106939 A1 | 4/2015 | Lietz et al. |
| 2015/0128246 A1 | 5/2015 | Feghali et al. |
| 2015/0128274 A1 | 5/2015 | Giokas |
| 2015/0150123 A1 | 5/2015 | Be'ery |
| 2015/0229661 A1 | 8/2015 | Balabine et al. |
| 2015/0371044 A1 | 12/2015 | Horne et al. |
| 2016/0098340 A1 | 4/2016 | Weaver et al. |
| 2016/0234167 A1* | 8/2016 | Engel .................. H04L 63/1408 |

FOREIGN PATENT DOCUMENTS

| | | |
|---|---|---|
| WO | WO 2012/135192 | 10/2012 |
| WO | WO 2013/067404 | 5/2013 |
| WO | WO 2015/102776 | 7/2015 |

OTHER PUBLICATIONS

Lietz et al., "Method and System for Creating and Dynamically Deploying Resource Specific Discovery Agents for Determining the State of a Cloud Computing Environment," U.S. Appl. No. 14/079,425, filed Nov. 13, 2013.

Lietz et al., "Method and System for Creating Enriched Log Data," U.S. Appl. No. 14/139,449, filed Dec. 23, 2013.

Cabrera et al., "Method and System for Intrusion and Extrusion Detection," U.S. Appl. No. 14/143,999, filed Dec. 30, 2013.

Cabrera et al., "Method and System for Extrusion and Intrusion Detection in a Cloud Computing Environment Using Network Communications Devices," U.S. Appl. No. 14/166,116, filed Jan. 28, 2014.

Cabrera et al., "Method and System for Extrusion and Intrusion Detection in a Cloud Computing Environment," U.S. Appl. No. 14/171,388, filed Feb. 3, 2014.

Lietz et al., "Method and System for Virtual Asset Assisted Extrusion and Intrusion Detection in a Cloud Computing Environment," U.S. Appl. No. 14/171,438, filed Feb. 3, 2014.

Bishop et al., "Method and System for Testing Cloud Based Applications in a Production Environment Using Fabricated User Data," U.S. Appl. No. 14/222,279, filed Mar. 21, 2014.

(56) References Cited

OTHER PUBLICATIONS

Weaver et al., "Method and System for Comparing Different Versions of a Cloud Based Application in a Production Environment Using Segregated Backend Systems," U.S. Appl. No. 14/231,141, filed Mar. 31, 2014.

Brinkley et al., "Method and System for Testing Cloud Based Applications and Services in a Production Environment Using Segregated Backend Systems," U.S. Appl. No. 14/231,253, filed Mar. 31, 2014.

Lietz et al., "Method and System for Providing Security Aware Applications," U.S. Appl. No. 14/247,131, filed Apr. 7, 2014.

Cabrera et al., Method and System for Providing Self-Monitoring, Self-Reporting, and Self-Repairing Virtual Assets in a Cloud Computing Environment, U.S. Appl. No. 14/256,289, filed Apr. 18, 2014.

Bishop et al., "Method and System for Ensuring an Application Conforms with Security and Regulatory Controls Prior to Deployment," U.S. Appl. No. 14/261,621, filed Apr. 25, 2014.

Lietz et al., "Method and System for Detecting Irregularities and Vulnerabilities in Dedicated Hosting Environments," U.S. Appl. No. 14/266,018, filed Apr. 30, 2014.

Lietz et al., "Method and System for Providing Reference Architecture Pattern-Based Permissions Management," U.S. Appl. No. 14/266,107, filed Apr. 30, 2014.

Cabrera et al., "Method and Apparatus for Automating the Building of Threat Models for the Public Cloud," U.S. Appl. No. 14/288,260, filed May 27, 2014.

Bonney et al., "Method and System for Implementing Data Security Policies Using Database Classification," U.S. Appl. No. 14/289,817, filed May 29, 2014.

Cabrera et al., "Method and System for Efficient Management of Security Threats in a Distributed Computing Environment," U.S. Appl. No. 14/319,352, filed Jun. 30, 2014.

Lietz et al., "Method and System for Providing a Virtual Asset Perimeter," U.S. Appl. No. 14/448,281, filed Jul. 31, 2014.

Cabrera et al., "Method and System for Providing Automated Self-Healing Virtual Assets," U.S. Appl. No. 14/448,326, filed Jul. 31, 2014.

Tupakula, et al.; "Security Techniques for Zero Day Attacks;" Proceedings of the 7th International Wireless Communications and Mobile Computing Conference; Jul. 4-8, 2011; IEEE.

Tupakula, et al.; "Intrusion Detection Techniques for Infrastructure as a Service Cloud;" 2011 IEEE Ninth International Conference on Dependable, Autonomic and Secure Computing; Dec. 12-14, 2011; IEEE.

\* cited by examiner

METHOD AND SYSTEM FOR SECURE DELIVERY OF INFORMATION TO COMPUTING ENVIRONMENTS

BACKGROUND

As various forms of distributed computing, such as cloud computing, have come to dominate the computing landscape, security has become a bottleneck issue that currently prevents the complete migration of various capabilities associated with sensitive data into cloud-based infrastructures, and/or other distributive computing models. This is at least partially because many owners and operators of data centers that provide access to data and other resources are hesitant to allow their data and resources to be accessed, processed, and/or otherwise used, by virtual assets in the cloud.

A major security issue in a cloud computing environment is that vulnerabilities associated with virtual assets are not always known or understood at the time the virtual assets are created and deployed, e.g., instantiated, in a given computing environment and, once deployed, detecting and/or responding to newly identified vulnerabilities through "normal" communications channels associated with the virtual assets can be challenging, if not impossible.

In addition, in some cases, malicious entity can take control of a virtual asset. In these cases, the malicious entity often takes over, or closes down, normal communications channels associated with the virtual asset. Consequently, in some cases, the malicious entity can mask the fact they have taken control of the virtual asset from other entities outside the virtual asset, such as entities deployed by the owner to monitor and enforce security policies. This leaves the malicious entity relatively free to manipulate the virtual asset under its control and access any data used by the virtual asset, with little concern of detection by the legitimate owner of the virtual asset. Even in cases where the legitimate owner of the virtual asset does become aware that the virtual asset has been compromised, if the malicious entity has shut down, or taken control of, the normal communications channels associated with the virtual asset, the malicious entity can thwart any traditional efforts by the legitimate owner to communicate with the virtual asset and/or repair the virtual asset.

What is needed is a method and system for protecting and repairing a virtual asset from damage by potential security threats.

SUMMARY

In accordance with one embodiment, a method and system protecting and repairing a virtual asset from damage by potential security threats may include monitoring a current virtual asset for potential security threats with a virtual asset agent running within the current virtual asset, according to one embodiment. The virtual asset agent may run within the current virtual asset to identify the potential security threats that risk compromising virtual asset data to unauthorized computing systems. The method and system may determine a severity of the potential security threats that are identified by the virtual asset agent for having gained access into the current virtual asset, according to one embodiment. The severity of the potential security threats is related to a content of the virtual asset data. If the severity is greater than a predetermined threshold, the method and system may create a new virtual asset with the virtual asset agent and decommissions the current virtual asset, according to one embodiment. In one embodiment, creating the new virtual asset can include copying the virtual asset data to the new virtual asset, copying one or more applications hosted by the current virtual asset to the new virtual asset, and copying the virtual asset agent to the new virtual asset to enable the new virtual asset to protect and repair the new virtual asset from the damage by the potential security threats. The method and system may receive, with the new virtual asset, secrets that are associated with the current virtual asset to enable the new virtual asset to continue operations of the current virtual asset, according to one embodiment. For example, upon receiving the secrets of the current virtual asset, the new virtual asset can decrypt and encrypt one or more databases and can establish communications channels previously used by the current virtual asset, according to one embodiment. The secrets received from an asset management computing system and can include passwords, passcodes, encryption keys, and the like.

In accordance with one embodiment, a method and system protecting and repairing a first asset from damage by potential security threats may include monitoring the first virtual asset, with an asset management computing system, to determine whether the first virtual asset includes security updates for the potential security threats, according to one embodiment. The first virtual asset may include a virtual asset agent configured monitor the first virtual asset for the potential security threats and repair the first virtual asset from the damage by the potential security threats. If the first virtual asset excludes one or more of the security updates for the potential security threats, the method and system may update the first virtual asset by transmitting the one or more of the security updates to the first virtual asset over a first communication channel from the asset management computing system, according to one embodiment. The first communication channel may be a trusted or secure communication channel. The first communication channel may be different than a second communication channel that is used by the asset management computing system to transmit and receive information over the Internet, according to one embodiment. The method and system may receive notification from the virtual asset agent that the virtual asset agent created a second virtual asset in response to the virtual asset agent detecting intrusion by the potential security threats into the first virtual asset, according to one embodiment. The method and system may transmit secrets associated with the first virtual asset to the second virtual asset using the first communication channel to enable to second virtual asset to continue operations of the first virtual asset, according to one embodiment.

Figure 1:
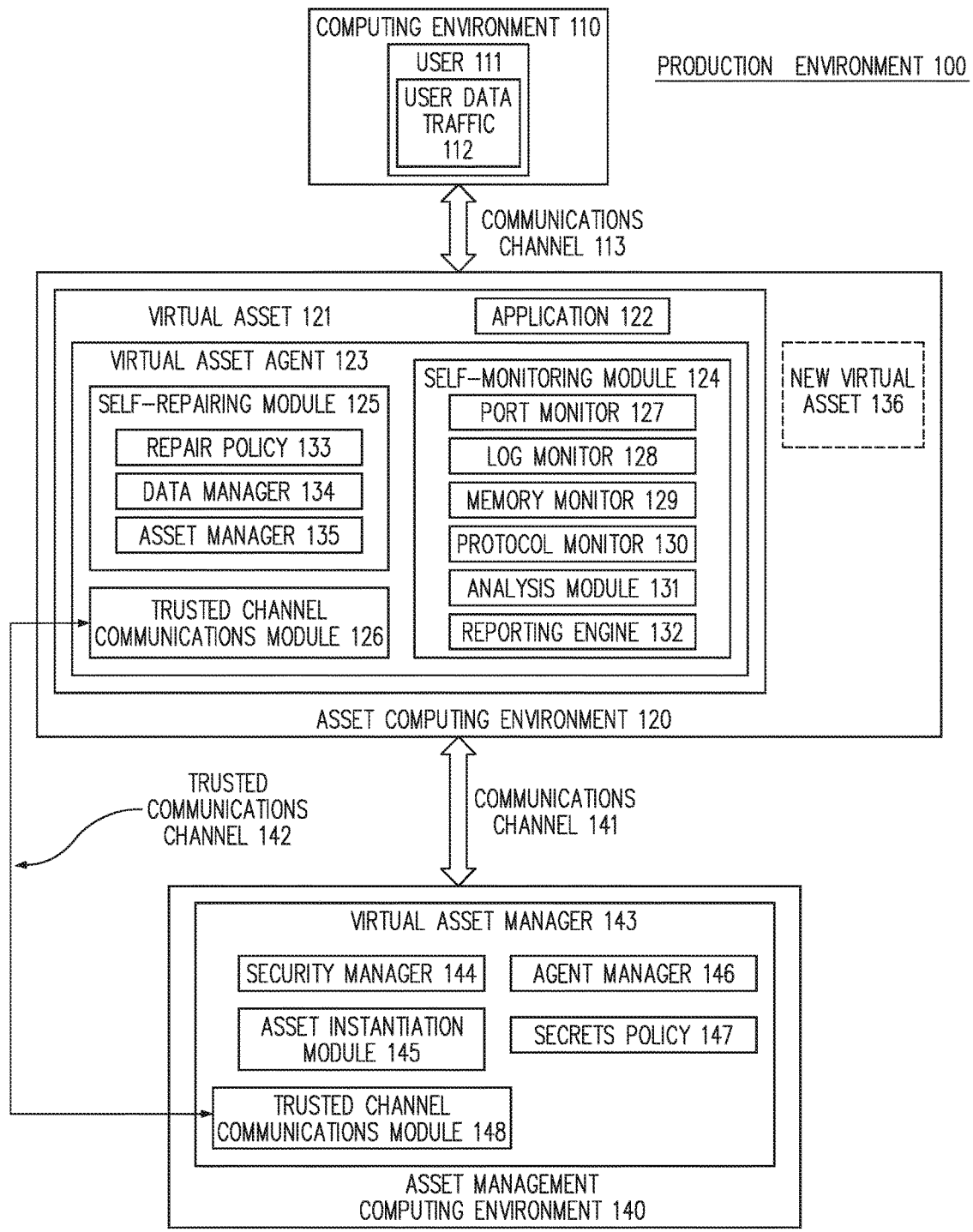
FIG. 1 is a block diagram of a hardware architecture for protecting and repairing a virtual asset from damage by potential security threats, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein include systems and processes suitable for protecting and repairing a virtual asset from damage by potential security threats, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate, application data must be transferred between a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

FIG. 1 illustrates a block diagram of a production environment 100 for protecting and repairing a virtual asset from damage by potential security threats, according to one embodiment. Once security threats, such as malicious software, have been injected or introduced into a virtual asset or computing environment, it can be difficult to remove the security threats or malicious code. Furthermore, all future communications to and from the virtual asset or computing environment can be compromised. For example, the security threat or malicious code can include communications monitors which can detect and/or intercept any software patches or security updates received by the asset in order to repair, scan, or otherwise remove the security threats. According to one embodiment, an agent may be installed on a virtual asset to monitor the asset for security threats or breaches and to prepare the asset for if/when potential security threats or breaches are detected. According to one embodiment, monitoring for potential security threats or breaches includes comparing a number of authorized open communication ports to a number of communication ports that are actually open in a virtual asset. In another embodiment, the agent can be configured to monitor one or more logs, monitor memory, monitor network protocols, or monitor other features or characteristics of the virtual asset and compare the operations of the virtual asset to one or more predetermined nominal or expected values. According to one embodiment, self-repairing the virtual asset can include copying or backing up data, instantiating a new asset, providing the new asset with the backed up copies of data, and terminating or decommissioning the virtual asset that has been identified as being compromised. In other embodiments, self-repairing includes waiting for user traffic to subside or decrease, prior to failing the compromised asset over to the new or replacement asset, according to one embodiment. The agent and/or an asset management computing system/environment can be configured to establish secure communications channels to transfer secrets, e.g., passwords, passcodes, encryption keys, or the like, and/or security updates. As discussed above, if a security update is transmitted to a compromised virtual asset, an existing security threat or malicious code that has gained access into the virtual asset can undermine the efficacy of the security update by detecting, subverting, and/or monitoring the functionality of the security update. Thus, an advantage of the present disclosure is that the agent can be configured to establish a trusted communication channel to receive security updates and/or to create or instantiate a new or uncompromised virtual asset to replace the compromised virtual asset, according to one embodiment.

The production environment 100 includes various computing environments for protecting and repairing a virtual asset from damage by potential security threats, according to one embodiment. The production environment 100 includes a computing environment 110 communicatively coupled to an asset computing environment 120, according to one embodiment. The production environment 100 also includes an asset management computing environment 140 communicatively coupled to the asset computing environment 120 and configured to manage one or more virtual assets hosted by or existing within the asset computing environment 120, according to one embodiment.

The computing environment 110 includes a user 111 that transmit and receive user data traffic 112 via communications channel 113, according to one embodiment. The user 111 can represent one or more computing systems configured to transmit, receive, store, update, manage, and/or otherwise manipulate information or applications hosted by virtual assets within the asset computing environment 120, according to various embodiments. For example, the user 111 can represent a subscriber to one or more services hosted by a virtual asset, such as Web services, database services, financial services, educational services, video services, social networking services, computing services, and/or the like, according to various embodiments.

The communication channel 113 can include one or more public or private networks or communications channels for communicating between the computing environment 110 and the asset computing environment 120. According to one embodiment, the communication channel 113 includes one or more networks, such as a LAN, WAN, PAN, intranet, and/or the Internet.

The asset computing environment 120 is configured to host one or more virtual assets 121 that are capable of self-monitoring, self-repairing, and establishing trusted communications channels with one or more other computing environments, according to one embodiment. The virtual asset 121 is an allocation of one or more hardware, software, and/or firmware resources to one or more customers or tenants. The tenant may purchase, rent, lease, borrow, or otherwise receive authorization to install, operate, transfer, and/or host applications and/or data with the virtual asset 121, according to one embodiment. The virtual asset 121 includes an application 122 and a virtual asset agent 123, according to one embodiment. The application 122 can provide an interface to the user 111 and can provide one or more databases, computing, or other services to the user 111.

The virtual asset agent 123 monitors and repairs the virtual asset 121, in addition to establishing trusted communications channels with other computing environments to initialize and/or update the virtual asset 121, according to one embodiment. In one embodiment, the virtual asset agent 123 is always running, for example, as a background program, e.g., a daemon, for the virtual asset 121. In another embodiment, the virtual asset agent 123 is selectively and/or periodically executed in response to one or more triggers such as a timer, instantiation of the virtual asset 121, user traffic, erroneous operation, or the like. The virtual asset agent 123 includes a self-monitoring module 124, a self-repairing module 125, and a trusted channel communications module 126, according to one embodiment.

The self-monitoring module 124 includes various modules and engines to monitor the security status and/or health of the virtual asset 121, according to one embodiment. The self-monitoring module 124 includes, but is not limited to, a port monitor 127, a log monitor 128, a memory monitor 129, a protocol monitor 130, an analysis module 131, and a reporting engine 132, according to one embodiment.

The port monitor 127 can be configured to monitor each of the communication ports of the virtual asset 121 for suspicious activity and/or characteristics. For example, if the virtual asset has opened/configured 13 different communication ports for use and the port monitor 127 detects 14 open communication ports, then the self-monitoring module 124 may note the discrepancy and/or notify one or more administrators of the discrepancy.

The log monitor 128 can be configured to read log files generated by the virtual asset agent 123 or generated by the virtual asset 121. For example, the virtual asset agent 123 or the virtual asset 121 may create log files which record all messages sent from the virtual asset 121. The log monitor 128 can check each of the Internet protocol ("IP") addresses of messages sent/transmitted by the virtual asset 121. For example, the log monitor 128 can be configured to periodically, e.g., every half-hour or every 12 hours, check all IP addresses of messages sent within the last predetermined period of time. The log monitor 128 can, for example, apply geographical location ("geolocation") detection utilities to each of the IP addresses to determine the approximate destination of the transmitted message. If, for example, a message has been transmitted to a prohibited or suspicious city, state, country, or region, e.g., rural Afghanistan, the log monitor 128 can be configured to alert an administrator, or otherwise flag the activity for the self-monitoring module 124.

The memory monitor 129 can be configured to monitor one or more memory locations allocated to the virtual asset 121 for potential security breaches and/or security threats, according to one embodiment. The memory monitor 129 may check memory blocks or locations for particular good or bad patterns or signatures. The good patterns or signatures, e.g., a checksum, can indicate that particular programs or memory locations have not been changed or maliciously manipulated. The bad/malicious patterns or signatures, e.g., a virus signature, can indicate that particular programs or memory locations have been infected by malicious software or code. Upon detecting one or more malicious patterns or signatures, the memory monitor 129 flags the signatures or patterns for further review or action by the self-monitoring module 124 or for an administrator, according to one embodiment.

The protocol monitor 130 can check the various network protocols to determine whether or not use of the network protocols is appropriate and/or expected, according to one embodiment. For example, the protocol monitor 130 can check the number of network protocols used to determine whether or not too many protocols have been used. The protocol monitor 130 can check the types of protocols used to determine the appropriateness of the types of protocols used. For example, if the virtual asset 121 is configured to provide non-database services, but network protocols related to database services are being employed, the protocol monitor 130 can flag the database-related protocol as potentially inappropriate so that the use of the protocol can be further evaluated. The protocol monitor 130 can also analyze characteristics of the protocols. For example, the protocol monitor 130 can compare the elements, commands, and/or sizes of protocol payloads to historic and/or expected and/or typical characteristics and can flag any anomalies or aberrations as suspicious or potentially inappropriate, according to one embodiment.

The analysis module 131 can be configured to receive one or more flags from the monitors within the self-monitoring module 124 and can be configured to compare and/or analyze the content of the flags or notifications received. For example, the analysis module 131 can maintain one or more tables or other data structures that identify which flagged behaviors have already been reviewed and/or dismissed by one or more analysts or administrators. The analysis module 131 can be configured to forward potentially valid security threats or security breaches to the reporting engine 132.

The reporting engine 132 transmits one or more reports to the self-repairing module 125, to the asset management computing environment 140, to one or more system administrators, and/or to the tenant to which the virtual asset 121 is allocated, according to one embodiment. According to one embodiment, the reporting engine 132 uses the trusted channel communications module 126 to establish a trusted communication channel with the asset management computing environment 140 to report suspicious and/or inappropriate operations, behaviors, characteristics, or other information determined by the self-monitoring module 124, according to one embodiment.

The self-repairing module 125 receives one or more flags, alerts, warnings, and/or reports from the self-monitoring module 124, e.g., the reporting engine 132, and performs self-repair operations in accordance with the weight or seriousness of the received flags, alerts, warnings, and/or reports, according to one embodiment. The self-repairing module 125 includes a repair policy 133, a data manager 134, and an asset manager 135. The self-repairing module 125 uses the repair policy 133, the data manager 134, and the asset manager 135 to determine the weight or severity of potential security breaches/threats and to create new or clean instances of the virtual asset 121 if the security breach/threat is determined to be too severe to repair, according to one embodiment.

The self-repairing module 125 uses the repair policy 133 to determine if the virtual asset agent 123 should create a new instance of the virtual asset 121, according to one embodiment. The repair policy 133 receives notification of the various flags, alerts, warnings, and/or reports from the reporting engine 132. The repair policy 133 then compares the content of the received reports to one or more tables, databases, or other data structures to determine if the security of the virtual asset 121 can withstand the risks associated with the generated flags, alerts, and/or warnings, according to one embodiment. For example the repair policy 133 can include a predetermined numerical threshold which, if exceeded, the self-repairing module 125 is configured to create a new instance of the virtual asset 121. For example, the repair policy 133 can have a predetermined value of 60 points. The repair policy 133 can assign each type of identified security threat or identified potential security threat a point value based on its potential effect or severity on the virtual asset 121. If the sum of the points of the identified security threats exceeds the predetermined value of the repair policy, then the self-repairing module 125 or the repair policy 133 determines that a new instance of the virtual asset 121 is to be created, according to one embodiment. In one embodiment, security threats or risks that can control communications to and from a virtual asset are given a higher weight of seriousness than security threats that simply slow down or interrupt the service provided by the virtual asset 121. Similarly, identified security threats or breaches that compromise sensitive information, such as credit card information, personal user information, or other user financial information, are assigned a higher weight, seriousness, or priority than other identified security threats or breaches, according to one embodiment.

The self-repairing module 125 attempts to repair an identified security threat or breach if the repair policy 133 determines that the security threat or breach is relatively minor, according to one embodiment. In one embodiment, a security threat or breach is relatively minor if the severity of the security threat or breach is below a predetermined threshold. For example, the self-repairing module 125 can be configured to interface with one or more anti-virus or anti-malware software programs and be configured to automatically execute one or more anti-virus or anti-malware software programs in response to identifying one or more security threats or breaches in the virtual asset 121. In another embodiment, the repair policy 133 can be configured to establish a trusted communication channel using the trusted channel communications module 126 to notify the asset management computing environment 140 of the security threat or breach. The repair policy 133 can then use the trusted channel communications module 126 to receive one or more security updates or security patches for execution on the virtual asset 121 to repair the one or more security threats or breaches, according to one embodiment. In one embodiment, the trusted channel communications module 126 and/or other parts of the virtual asset agent 123 perform validation of the authenticity of software, data, or other information received over the trusted communication channel established by the trusted channel communications module 126. In some embodiments, the asset management computing environment 140 requests and retrieves the security update or security patch from a third party, e.g., a software security vendor, and transmits the security update or security patch to the virtual asset agent upon verification of the validity or authenticity of the security update or security patch.

The self-repairing module 125 creates a new instance of the virtual asset 121 if the repair policy 133 determines that one or more security threats or breaches are relatively major and/or are difficult to remove/repair. The self-repairing module 125 uses the data manager 134 to backup the data associated with the virtual asset 121. In the case that the virtual asset 121 is configured to provide database services, the data manager 134 creates a copy of one or more databases and stores the copies in a location that is external to the virtual asset 121, e.g., in another memory store within the asset computing environment 120, according to one embodiment. Once the new instance is in place, the self-repairing module 125 can cause the database to fail over to the new instance of the database in the new instance of the virtual asset. In other embodiments, the data manager 134 transmits backup copies of the data to one or more cloud storage vendors for temporary storage, according to one embodiment.

The self-repairing module 125 uses the asset manager 135 to re-instantiate the virtual asset 121, according to one embodiment. The asset manager 135 can be configured to communicate with the asset management computing environment 140 and initialize or create another or new virtual asset 136 within the asset computing environment 120. The asset manager 135 can initialize the new virtual asset 136 to reflect the content and operations of the virtual asset 121. The asset manager 135 initializes the new virtual asset 136 with a copy of the virtual asset agent 123 and with a copy of the data that was backed up with the data manager 134, according to one embodiment. The asset manager 135 can also be configured to initialize the new virtual asset 136 with a copy of the application 122, according to one embodiment. In one embodiment, the asset manager 135 retains a copy of the application 122 as it was initially injected into the virtual asset 121, and injects the retained copy into the new virtual asset 136 during initialization of the new virtual asset 136. During initialization of the new virtual asset 136, the asset manager 135 requests clean or updated copies of the secrets used during the operations of the virtual asset 121. The trusted channel communications module 126 is operable to provide a trusted communication channel between the virtual asset 121 and the asset management computing environment 140 or between the new virtual asset 136 and the asset management computing environment 140. The delivery of the clean or updated version of the secrets of the virtual asset 121 to the new virtual asset 136 can enable the new virtual asset 136 to establish secure communications, decode and/or encrypt databases, transmit information through one or more gateways, and the like. In one embodiment, the asset manager 135 requests an updated version of the secrets for the virtual asset 121 through the trusted channel communications module 126 to prevent or reduce the risk of interception of the secrets by one or more security threats or otherwise malicious programs, according to one embodiment.

After the asset manager 135 receives verification that the new virtual asset 136 is properly operating, from the asset management computing environment 140 or from the new virtual asset 136, the asset manager 135 can initiate a self-destruct or decommissioning operation to remove the virtual asset 121 from the asset computing environment 120, or to render the virtual asset 121 inoperable, according to one embodiment. For example, according to one embodiment, the asset manager 135 can communicate with the asset computing environment 120 or with the asset management computing environment 140 to disassociate, erase, or otherwise forfeit the memory locations, memory blocks, or memory resources that were previously allocated for use by the virtual asset 121.

The asset management computing environment 140 is communicatively coupled to the asset computing environment 120 through a communication channel 141 and a trusted communication channel 142 to manage one or more virtual assets in the asset computing environment 120, according to one embodiment. The asset management computing environment 140 includes a virtual asset manager 143 that is configured to provide security updates and provide copies of secrets to the virtual assets of the asset computing environment 120, according to one embodiment. In other embodiments, the virtual asset manager 143 is also configured to instantiate virtual assets within the asset computing environment 120.

The virtual asset manager 143 includes a security manager 144, an asset instantiation module 145, and agent manager 146, a secrets policy 147, and a trusted channel communications module 148, according to one embodiment. The security manager 144 receives flags, alerts, warnings, and/or reports of security threats/breaches or other suspicious activities or communications associated with the virtual asset 121. The security manager 144 is configured to facilitate the repair policy 133 in determining whether the self-repairing module 125 will create a new instance of the virtual asset 121 or repair the current security threats, according to one embodiment. The security manager 144 can be configured to provide the repair policy 133 with lists, names, and or characteristics of new security threats as they emerge and are identified. The security manager 144 may also be configured to manage one or more lists, tables, or other data structures relating to operations or characteristics that the self-monitoring module 124 should search for while monitoring the virtual asset 121, according to one embodiment The asset instantiation module 145 communicates with the self-repairing module 125 to support the creation of one or more new instances of the virtual asset 121, e.g., the new virtual asset 136, according to one embodiment. As described above, the self-repairing module 125 can be configured to instantiate new versions or instances of the virtual asset 121 without the support of the asset management computing environment 140. In other embodiments, when the self-repairing module 125 determines that a new instance of the virtual asset 121 should be created, the self-repairing module 125 requests that the virtual asset manager 143 create a new instance of the virtual asset 121, and the asset instantiation module 145 creates the new instance of the virtual asset 121 in the asset computing environment 120, according to one embodiment. The asset instantiation module 145 may communicate with the secrets policy 147 and with the agent manager 146 to instantiate or initialize the new virtual asset 136 with a copy of the virtual asset agent 123 and with clean and/or updated copies of any secrets associated with the virtual asset 121. By providing the secrets associated with the virtual asset 121, the new virtual asset 136 can be enabled to perform, take over, and/or continue any operations that were previously executed or performed by the virtual asset 121, according to one embodiment.

The virtual asset manager 143 can use the trusted channel communications module 148 to communicate with the virtual asset agent 123 by the trusted communication channel 142, in one embodiment. The ability for the virtual asset manager 143 to communicate with the virtual asset 121 via the communication channel 141 and via the trusted communication channel 142 may reduce the risk that a security threat, e.g., the malicious software program, will intercept, detect, and/or undermine the efficacy of any security updates provided by the virtual asset manager 143 to the virtual asset agent 123, according to one embodiment. For example, the virtual asset manager 143, e.g., the security manager 144, may be configured to use the trusted channel communications module 148 to transmit updates to the virtual asset agent 123 via the trusted communication channel 142 to enable the virtual asset agent 123 to operate with up-to-date anti-virus, anti-malware, or other security features, according to one embodiment. In another embodiment, the virtual asset manager 143 is configured to periodically transmit updated copies of secrets to the virtual asset 121 in accordance with the secrets policy 147. For example, the secrets policy 137 may determine that secrets for the virtual asset 121 are updated/refreshed on a quarterly, semiannual, annual, biannual, etc., basis. Accordingly, the asset management computing environment 140 communicates with the virtual asset 121 with the trusted communication channel 142: to update secrets for the virtual asset 121; to update the virtual asset agent 123; to selectively create new instances of the virtual asset 121; and/or to support the ability of the virtual asset 121 and the virtual asset agent 123 in monitoring and repairing potential and actual security threats or breaches that may compromise the contents and/or operations of the virtual asset 121, according to various embodiments.

Figure 2:
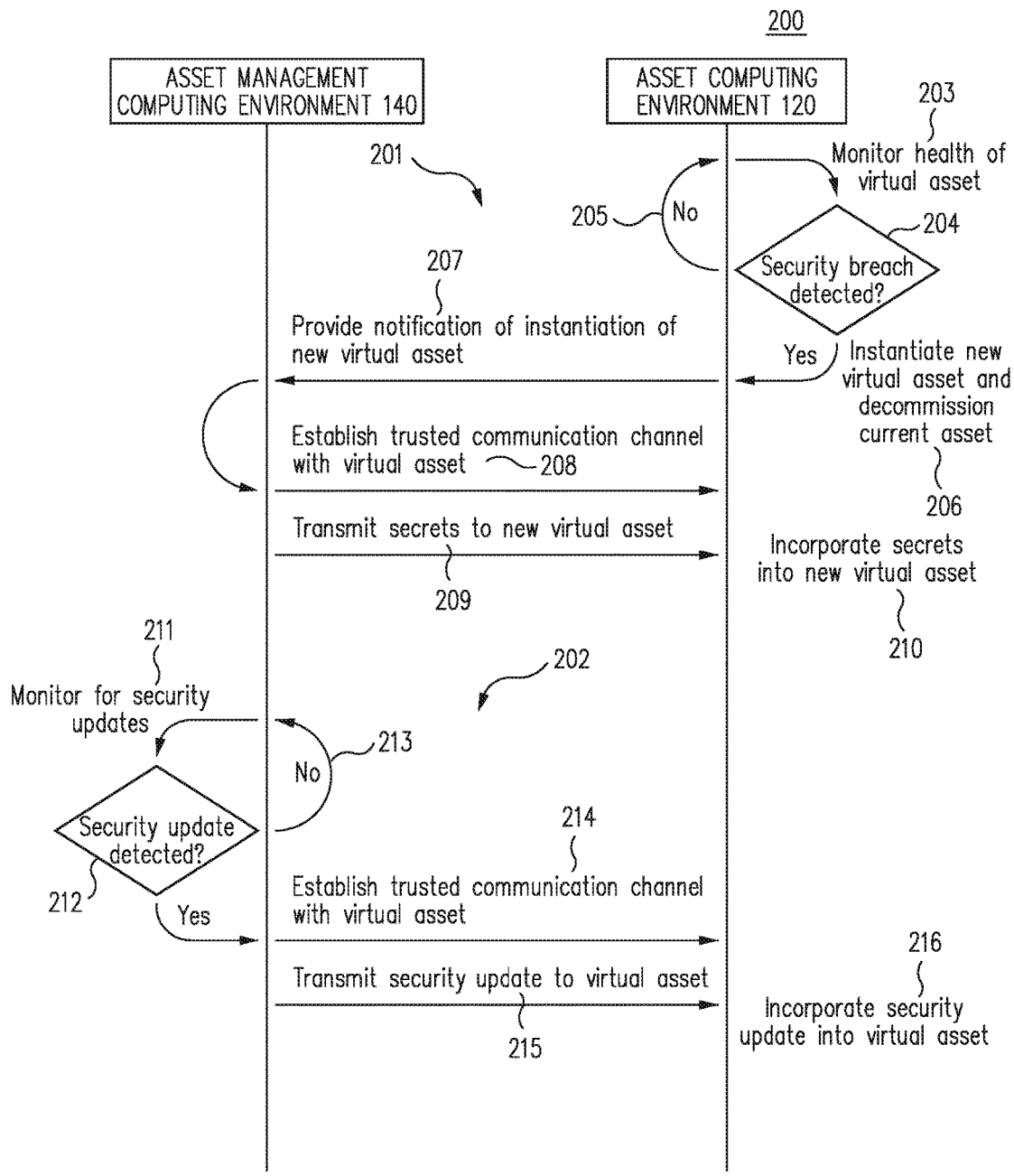
FIG. 2 is a function flow diagram of the hardware architecture of FIG. 1, in accordance with one embodiment.

FIG. 2 illustrates a functional diagram 200 of the production environment 100, according to one embodiment. The asset computing environment 120 includes virtual assets that use virtual asset agents to self-monitor for security threats and breaches and to self-repair identified/detected security threats and breaches within the virtual assets, according to one embodiment. In some embodiments, the virtual asset agents create or instantiate instances of new virtual assets instead of attempting to specifically identify and remove security threats, such as malicious code or programs, from existing instances of virtual assets. The functional diagram 200 of the production environment 100 can be roughly broken into two processes 201 and 202, which may be executed concurrently or sequentially (in either order), according to various embodiments. The process 201 is associated with monitoring for and repairing security threats within the virtual asset 121 by using the virtual asset agent 123, according to one embodiment. The process 202 is associated with providing security updates to the virtual asset 121, e.g., the virtual asset agent 123, according to another embodiment.

At 203, the asset computing environment 120 monitors the health of the virtual asset, e.g., the virtual asset 121, according to one embodiment. As described above, the self-monitoring module 124 can be configured to monitor various aspects of the virtual asset 121, such as, communication ports, logs, memory, and network protocols, according to one embodiment.

At 204, the asset computing environment 120 determines whether a security breach has been detected, according to one embodiment. More specifically, the analysis module 131 of the self-monitoring module 124, or the repair policy 133 of the self-repairing module 125, determines whether a security breach has been detected and may determine whether the severity of the security breach warrants further action. If the virtual asset agent 123 determines that no further action should be taken, the process follows path 205 and the asset computing environment 120 continues to monitor the health of the virtual asset, e.g., the virtual asset 121.

At 206, the asset computing environment 120, or the virtual asset agent 123, determines that a major or severe security breach has been detected, the asset computing environment 120 instantiates a new virtual asset, e.g., new virtual asset 136, and decommissions the current virtual asset, e.g., the virtual asset 121, according to one embodiment. Instantiation of the new virtual asset 136 can include copying data of the virtual asset 121, creating the new virtual asset 136, transferring the copy of the data to the new virtual asset 136, installing an instance of the virtual asset agent 123 onto the new virtual asset 136, and/or installing an instance of the application 122 onto the new virtual asset 136, according to one embodiment. Decommissioning the virtual asset 121 can include erasing or reallocating memory that was allocated to the virtual asset 121. According to one embodiment, the current virtual asset is a first virtual asset and the new virtual asset is a second virtual asset.

At 207, the asset computing environment 120 provides notification of instantiation of the new virtual asset, e.g., new virtual asset 136, to the asset management computing environment 140, according to one embodiment. The asset computing environment 120 may establish a trusted or secure communication channel with the asset management computing environment 140 prior to providing notification of the instantiation of the new virtual asset 136, according to one embodiment.

At 208, the asset management computing environment 140 establishes a trusted communication channel with the new virtual asset, e.g., the new virtual asset 136, and at 209, the asset management computing environment 140 transmits secrets to the new virtual asset, e.g., the new virtual asset 136, according to one embodiment. The secrets transmitted to the new virtual asset 136 can be a copy of the secrets of the virtual asset 121. The copy of the secrets can enable the new virtual asset 136 to continue the operations of the virtual asset 121, according to one embodiment.

At 210, the asset computing environment 120, e.g., the new virtual asset 136, incorporates the received secrets into the new virtual asset, e.g., the new virtual asset 136, according to one embodiment. Incorporation of the secrets can enable the new virtual asset 136 to established communications, to decode or encrypt databases, and to transmit messages through various gateways and communication paths, according to one embodiment.

The process 201 and the process 202 can be executed sequentially, in either order, or can be executed concurrently, according to one embodiment. At 211 the asset management computing environment 140 monitors for security updates, according to one embodiment. The asset management computing environment 140 can be configured to monitor various computer security vendors' websites or databases for security updates or other information related to new security threats. At 212, the asset management computing environment 140 determines if a security update has been detected. If the asset management computing environment 140 determines that a security update has not been detected, at 213, the process 202 returns to monitoring for security updates. If the asset management computing environment 140 determines that a security update has been detected, at 214, the asset management computing environment 140 establishes a trusted communication channel with the virtual asset, e.g., the virtual asset 121 or the new virtual asset 136, according to one embodiment. At 215, using the established trusted communication channel, the asset management computing environment 140 transmits the security update to the virtual asset, e.g., the virtual asset 121 or the new virtual asset 136, according to one embodiment. The security update can include any one of a number of security updates, such as security patches, software updates, or the like.

At 216, the asset computing environment 120, e.g., the virtual asset agent 123 or the new virtual asset 136, incorporates the security update into the virtual asset, e.g., the virtual asset 121 or the new virtual asset 136, according to one embodiment.

Process

Figure 3:
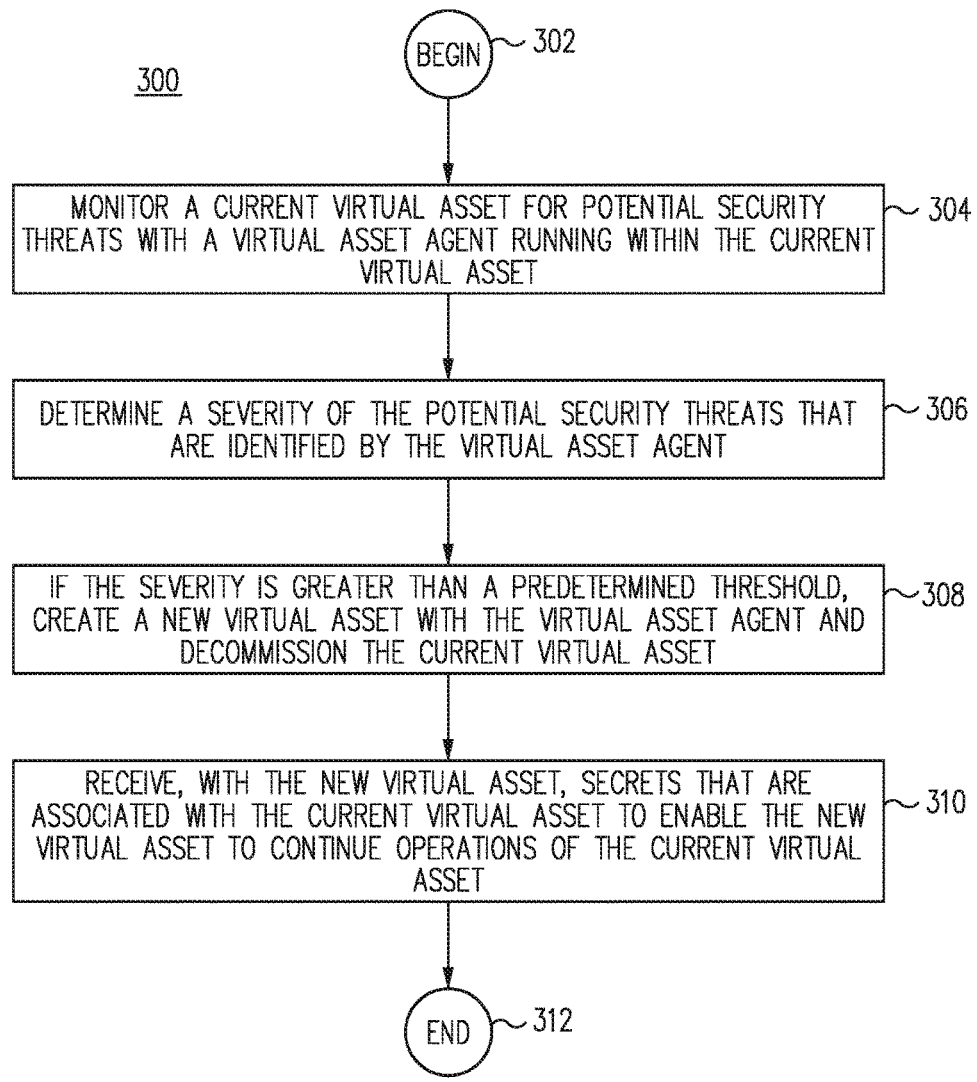
FIG. 3 is flow diagram for protecting and repairing a virtual asset from damage by potential security threats, in accordance with one embodiment.

FIG. 3 illustrates a flow diagram of a process 300 for protecting and repairing a virtual asset from damage by potential security threats, according to various embodiments.

At block 302, the process begins.

At block 304, the process monitors a current virtual asset for potential security threats with a virtual asset agent running within the current virtual asset, according to one embodiment. The virtual asset agent runs within the current virtual asset to identify the potential security threats that risk compromising virtual asset data to unauthorized computing systems.

At block 306, the process determines a severity of the potential security threats that are identified by the virtual asset agent for having gained access into the current virtual asset, according to one embodiment. The severity of the potential security threats is related to a content of the virtual asset data. For example, if the content of the virtual asset data is financial information or security information such as passwords, passcodes, or credit card information, the severity of the potential security threats will be greater than if the content includes information that is hosted on a public website or webpage.

At block 308, if the severity is greater than a predetermined threshold, the process creates a new virtual asset with the virtual asset agent and decommissions the current virtual asset, according to one embodiment. In one embodiment, creating the new virtual asset can include copying the virtual asset data to the new virtual asset, copying one or more applications hosted by the current virtual asset to the new virtual asset, and copying the virtual asset agent to the new virtual asset to enable the new virtual asset to protect and repair the new virtual asset from the damage by the potential security threats.

At block 310, the process receives, with the new virtual asset, secrets that are associated with the current virtual asset to enable the new virtual asset to continue operations of the current virtual asset, according to one embodiment. For example, upon receiving the secrets of the current virtual asset, the new virtual asset can decrypt and encrypt one or more databases and can establish communications channels previously used by the current virtual asset, according to one embodiment. The secrets are received from an asset management computing system and can include passwords, passcodes, encryption keys, and the like.

At block 312, the process ends.

Figure 4:
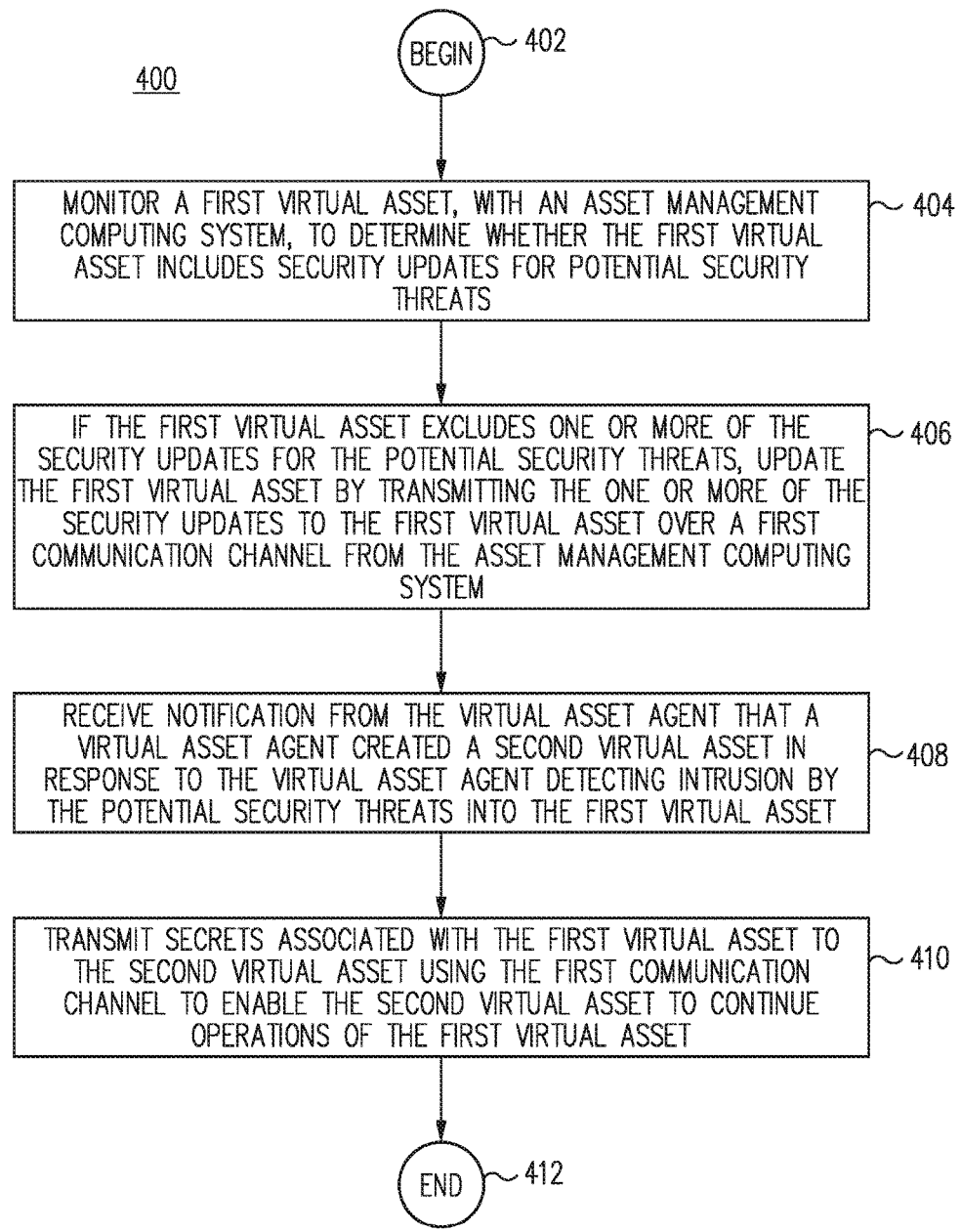
FIG. 4 is a flow diagram for protecting and repairing a virtual asset from damage by potential security threats, in accordance with one embodiment.

FIG. 4 illustrates a flow diagram of a process 400 for protecting and repairing a virtual asset from damage by potential security threats, according to various embodiments.

At block 402, the process begins.

At block 404, the process monitors the first virtual asset, with an asset management computing system, to determine whether the first virtual asset includes security updates for the potential security threats, according to one embodiment. The first virtual asset includes a virtual asset agent configured monitor the first virtual asset for the potential security threats and repair the first virtual asset from the damage by the potential security threats.

At block 406, if the first virtual asset excludes one or more of the security updates for the potential security threats, the process updates the first virtual asset by transmitting the one or more of the security updates to the first virtual asset over a first communication channel from the asset management computing system, according to one embodiment. The first communication channel is a trusted or secure communication channel. The first communication channel is different than a second communication channel that is used by the asset management computing system to transmit and receive information over the Internet, according to one embodiment.

At block 408, the process receives notification from the virtual asset agent that the virtual asset agent created a second virtual asset in response to the virtual asset agent detecting intrusion by the potential security threats into the first virtual asset, according to one embodiment.

At block 410, the process transmits secrets associated with the first virtual asset to the second virtual asset using the first communication channel to enable the second virtual asset to continue operations of the first virtual asset, according to one embodiment. Operations of the first asset include, but are not limited to, providing database services, computing services, financial services or other cloud-based or network-based services.

At block 412, the process ends.

As noted above, the specific illustrative examples discussed above are but illustrative examples of implementations of embodiments of the method or process for protecting and repairing a virtual asset. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for protecting and repairing a current virtual asset from damage by potential security threats, comprising:
monitoring the current virtual asset for the potential security threats with a virtual asset agent running within the current virtual asset to identify the potential security threats that risk compromising virtual asset data to unauthorized computing systems, the monitoring including identifying whether a network protocol being employed is a security threat as compared with a services configuration of the current virtual asset and considering that a security threat exists if the network protocol is not within the services configuration;
determining a severity of the potential security threats that are identified by the virtual asset agent for having gained access into the current virtual asset, the determined severity being greater if the content of the virtual asset data is financial information or security information than if the content includes information that is hosted on a public website or webpage;
responsive to determining that the severity is greater than a predetermined threshold, creating a new virtual asset with the virtual asset agent and decommissioning the current virtual asset,
wherein creating the new virtual asset includes:
copying the virtual asset data to the new virtual asset,
copying one or more applications hosted by the current virtual asset to the new virtual asset, and
copying the virtual asset agent to the new virtual asset, and further wherein the virtual asset agent is a current virtual asset agent, wherein copying the virtual asset agent to the new virtual asset includes installing a new version of the current virtual asset agent onto the new virtual asset as a second virtual asset agent;
if the severity is less than the predetermined threshold, requesting a software update from the management computing system;
establishing a trusted communication channel with the management computing system; and
receiving the software update from the management computing system over the trusted communication channel;
receiving, with the new virtual asset, secrets that are associated with the current virtual asset to enable the new virtual asset to continue operations of the current virtual asset, wherein the secrets are received from an asset management computing system.

2. The method of claim 1, wherein monitoring the current virtual asset includes monitoring one or more ports, log files, memory locations, and network protocols of the current virtual asset.

3. The method of claim 2, wherein monitoring the one or more ports of the current virtual asset includes comparing a number of authorized open ports in the current virtual asset with a number of actual open ports in the current virtual asset.

4. The method of claim 2, wherein monitoring the log files of the current virtual asset includes:
determining destination IP addresses of messages sent from the current virtual asset;
determining a geographical location associated with each destination IP address; and
generating a security breach alert if the geographical location associated with any of the destination IP addresses is within one of a number of flagged regions.

5. The method of claim 2, wherein monitoring the memory locations includes searching for patterns or signatures associated with malicious software or code.

6. The method of claim 1, wherein the severity includes a numerical value that is a sum of numerical values of the potential security threats identified by the virtual asset agent for having gained access into the current virtual asset.

7. A system for protecting and repairing a current virtual asset from damage by potential security threats, the system comprising:
at least one processor; and
at least one memory coupled to the at least one processor, the at least one memory having stored therein instructions which, when executed by any set of the one or more processors, perform a process for protecting and repairing a current virtual asset from damage by potential security threats, the process including:
monitoring the current virtual asset for the potential security threats with a virtual asset agent running within the current virtual asset to identify the potential security threats that risk compromising virtual asset data to unauthorized computing systems, the monitoring including identifying whether a network protocol being employed is a security threat as compared with a services configuration of the current virtual asset and considering that a security threat exists if the network protocol is not within the services configuration;
determining a severity of the potential security threats that are identified by the virtual asset agent for having gained access into the current virtual asset, the determined severity being greater if the content of the virtual asset data is financial information or security information than if the content includes information that is hosted on a public website or webpage;
responsive to determining that the severity is greater than a predetermined threshold, creating a new virtual asset with the virtual asset agent and decommissioning the current virtual asset, wherein creating the new virtual asset includes:
copying the virtual asset data to the new virtual asset,
copying one or more applications hosted by the current virtual asset to the new virtual asset, and
copying the virtual asset agent to the new virtual asset, wherein the virtual asset agent is a current virtual asset agent, wherein copying the virtual asset agent to the new virtual asset includes installing a new version of the current virtual asset agent onto the new virtual asset as a second virtual asset agent;
if the severity is less than the predetermined threshold,
requesting a software update from the management computing system;
establishing a trusted communication channel with the management computing system; and
receiving the software update from the management computing system over the trusted communication channel; and receiving, with the new virtual asset, secrets that are associated with the current virtual asset to enable the new virtual asset to continue operations of the current virtual asset, wherein the secrets are received from an asset management computing system.

8. The system of claim 7, wherein monitoring the current virtual asset includes monitoring one or more ports, log files, memory locations, and network protocols of the current virtual asset.

9. The system of claim 8, wherein monitoring the one or more ports of the current virtual asset includes comparing a number of authorized open ports in the current virtual asset with a number of actual open ports in the current virtual asset.

10. The system of claim 8, wherein monitoring the log files of the current virtual asset includes:
- determining destination IP addresses of messages sent from the current virtual asset;
- determining a geographical location associated with each destination IP address; and
- generating a security breach alert if the geographical location associated with any of the destination IP addresses is within one of a number of flagged regions.

11. The system of claim 8, wherein monitoring the memory locations includes searching for patterns or signatures associated with malicious software or code.

12. The system of claim 7, wherein the severity includes a numerical value that is a sum of numerical values of the potential security threats identified by the virtual asset agent for having gained access into the current virtual asset.

* * * * *